United States Patent
Noguchi et al.

(10) Patent No.: US 7,901,746 B2
(45) Date of Patent: Mar. 8, 2011

(54) TRANSPARENT CONDUCTIVE FILM AND TOUCH PANEL

(75) Inventors: Tomonori Noguchi, Ibaraki (JP); Katsunori Takada, Ibaraki (JP); Hiroyuki Takao, Ibaraki (JP); Daisuke Hamamoto, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 42 days.

(21) Appl. No.: 11/993,929

(22) PCT Filed: Jan. 12, 2007

(86) PCT No.: PCT/JP2007/050334
§ 371 (c)(1),
(2), (4) Date: Dec. 26, 2007

(87) PCT Pub. No.: WO2007/099721
PCT Pub. Date: Sep. 7, 2007

(65) Prior Publication Data
US 2009/0029151 A1    Jan. 29, 2009

(30) Foreign Application Priority Data
Mar. 1, 2006   (JP) ................................ 2006-055290

(51) Int. Cl.
C09K 19/00   (2006.01)
B32B 17/42   (2006.01)
G02F 1/1335  (2006.01)

(52) U.S. Cl. .......... 428/1.5; 428/423.1; 428/500; 349/12

(58) Field of Classification Search ............... 428/423.1, 428/500, 1.5; 349/16
See application file for complete search history.

(56) References Cited

U.S. PATENT DOCUMENTS

| 6,306,509 | B2 * | 10/2001 | Takeuchi et al. ........... 428/425.8 |
| 7,153,563 | B2 * | 12/2006 | Shoshi et al. ................. 428/220 |
| 7,390,099 | B2 * | 6/2008 | Takao et al. .................... 359/601 |
| 2003/0118941 | A1 | 6/2003 | Hayakawa et al. |
| 2004/0071974 | A1 | 4/2004 | Shoshi et al. |
| 2005/0221054 | A1 | 10/2005 | Kawano et al. |

FOREIGN PATENT DOCUMENTS

| CN | 1432029 A | 7/2003 |
| CN | 1490361 A | 4/2004 |
| JP | 7-335379 A | 12/1995 |
| JP | 2667686 B2 | 10/1997 |

(Continued)

OTHER PUBLICATIONS

Korean Office Action dated Jul. 28, 2008, issued in corresponding Korean Patent Application 10-2007-7017698.

(Continued)

*Primary Examiner* — Thao T. Tran
(74) *Attorney, Agent, or Firm* — Westerman, Hattori, Daniels & Adrian, LLP (57) ABSTRACT

A transparent conductive film of the present invention comprises: a transparent film substrate; a hard-coating layer provided on one side of the transparent film substrate; and a transparent conductive thin layer provided on another side of the transparent film substrate, wherein the hard-coating layer is made from a material containing a urethane acrylate, a polyol (meth)acrylate and a (meth)acrylic polymer having an alkyl group containing two or more hydroxyl groups. The transparent conductive film of the present invention has good scratch resistance.

9 Claims, 1 Drawing Sheet

FOREIGN PATENT DOCUMENTS

| | | |
|---|---|---|
| JP | 2001-281416 A | 10/2001 |
| JP | 2005-186576 A | 7/2005 |
| JP | 2005-209431 A | 8/2005 |
| JP | 2006-30837 A | 2/2006 |
| KR | 10-2004-0095315 A | 11/2004 |

OTHER PUBLICATIONS

Notification of Transmittal of Translation of the International Preliminary Report on Patentability (Form PCT/IB/338) of International Application No. PCT/JP2007/050334 mailed Sep. 12, 2008 with Forms PCT/IB/373, PCT/ISA/237 and PCT/IB/326.

International Search Report of PCT/JP2007/050334, date of mailing Feb. 27, 2007.

Chinese Office Action dated Apr. 26, 2010, issued in corresponding Chinese Patent Application No. 200780000108.9.

* cited by examiner

TRANSPARENT CONDUCTIVE FILM AND TOUCH PANEL

TECHNICAL FIELD

The present invention relates to a transparent conductive film that is transparent in the visible light region and has electrical conductivity. The present invention also relates to a touch panel using the transparent conductive film. The transparent conductive film may be used for transparent electrodes in touch panels and advanced display systems such as liquid crystal displays and electroluminescence displays and used for electromagnetic wave shielding or prevention of static charge of transparent products.

BACKGROUND ART

Conventionally, the so-called conductive glass is well known as a transparent conductive thin layer, which comprises a glass and an indium oxide thin layer formed thereon. Since the conductive glass has a glass substrate, however, it has low flexibility or workability and cannot be used for certain purposes. In recent years, therefore, transparent conductive films using various types of plastic films such as polyethylene terephthalate films as their substrate have been used, because of their advantages such as good impact resistance and light weight as well as flexibility and workability.

However, the transparent conductive films using such film substrates have low surface scratch resistance, so that they can have problems in which they can get scratched to have an increased electrical resistance or suffer from disconnection during use. Thus, there is a problem in which the inferior properties of the conventional transparent conductive thin layers can make the life of touch panels short.

Against the problem with scratch resistance, it has been proposed that a hard-coating layer is formed on one side of a transparent film substrate (see Patent Literature 1 below). Although the transparent conductive film having the hard-coating layer as described in Patent Literature 1 can have somewhat improved scratch resistance, there have been higher requirements for such properties.

Patent Literature 1: Japanese Patent No. 2667686

DISCLOSURE OF THE INVENTION

Objects to be Achieved by the Invention

It is an object of the present invention to provide a transparent conductive film with good scratch resistance.

It is another object of the present invention to provide a touch panel using such a transparent conductive film.

Means for Solving the Problems

As a result of investigation for solving the above problems, the present inventors have found that the above objects can be achieved with the transparent conductive film and touch panel described below and have completed the present invention.

The present invention relates to a transparent conductive film, comprising: a transparent film substrate; a hard-coating layer provided on one side of the transparent film substrate; and a transparent conductive thin layer provided on another side of the transparent film substrate, wherein the hard-coating layer is made from a material containing a urethane acrylate, a polyol (meth)acrylate and a (meth)acrylic polymer having an alkyl group containing two or more hydroxyl groups.

According to this feature, the material for forming the hard-coating layer contains urethane acrylate so that elasticity and flexibility can be imparted to the hard-coating layer. The component of the polyol(meth)acrylate allows the hard-coating layer to have high hardness so that the scratch resistance can be improved. The further addition of the (meth)acrylic polymer having an alkyl group containing two or more hydroxyl groups can lessen hardening shrinkage of the hard-coating layer.

In the transparent conductive film, the polyol (meth)acrylate preferably comprises pentaerythritol triacrylate and pentaerythritol tetraacrylate.

According to this feature, high hardness and good flexibility can be provided, and the scratch resistance can be further improved.

In the transparent conductive film, the hard-coating layer is preferably provided on the transparent film substrate with an adhesion facilitating treatment layer interposed therebetween.

In the transparent conductive film, a laminate of two or more pieces of transparent film substrate bonded to one another with a transparent adhesive layer interposed therebetween can be used as the transparent film substrate.

In the transparent conductive film, the hard-coating layer may have an uneven outer surface.

According to this feature, the unevenness structure of the outer surface of the hard-coating layer can scatter light to prevent light from being reflected only in a specific direction so that glare can be prevented. This feature can provide antiglare properties.

In the transparent conductive film in which the hard-coating layer has an uneven outer surface, the hard-coating layer preferable contains fine particles and has a thickness of 15 μm to 30 μm, and the fine particles preferably have an average particle size of 30% to 75% of the thickness of the hard-coating layer, and the fine particles preferably form unevenness with a θa value of 0.4° to 1.50 according to JIS B 0601.

According to this feature, the hard-coating layer with a thickness of 15 to 30 μm has a structure prevented from having insufficient hardness. In addition, the hard-coating layer contains fine particles with an average particle size of 30% to 75% of its thickness, and the fine particles form unevenness with a θa value of 0.4° to 1.5°. The fine particles have relatively large particle sizes with respect to the thickness of the hard-coating layer. Thus, at least some of the fine particles are allowed to protrude from the surface part of the hard-coating layer so that good antiglare properties can be provided. It is also possible to prevent a reduction in scratch resistance, which would otherwise be caused when fine particles with smaller sizes less susceptible to gravitational sedimentation are used. According to this feature, therefore, there can be provided an antiglare transparent conductive film with high hardness, good antiglare properties and high scratch resistance.

In the transparent conductive film, the material for forming the hard-coating layer preferably contains a leveling agent. The leveling agent is preferred when the hard-coating layer contains the fine particles as described above.

The present invention also relates to a touch panel, comprising: a pair of panel plates each having a transparent conductive thin layer; and a spacer which is interposed between the pair of panel plates and with which the pair of panel plates are arranged opposite to each other in such a manner that the transparent conductive thin layers are opposed to each other, wherein at least one of the panel plates is the above described transparent conductive film.

The touch panel using the transparent conductive film as a panel plate has good scratch resistance, and, therefore, there can be provided touch panels in which these properties are good.

DESCRIPTION OF MARKS

In the drawings, reference marks 1, 11a and 12a each represent a transparent film substrate, reference mark 11b represents a pressure-sensitive adhesive layer, reference mark 2 represents a transparent conductive thin layer, reference mark 3 represents a hard-coating layer, and reference mark 4 represents an antireflection layer.

BEST MODE FOR CARRYING OUT THE INVENTION

Figure 1:
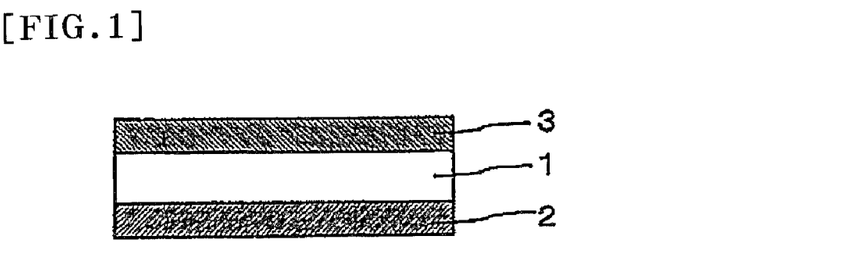
FIG. 1 is a cross-sectional view showing an example of the transparent conductive film of the present invention.

The present invention is described below with reference to the drawings. FIG. 1 shows an example of the transparent conductive film of the present invention, which includes a transparent film substrate 1, a transparent conductive thin layer 2 provided on one side of the substrate 1, and a hard-coating layer 3 provided on the other side thereof.

Figure 2:
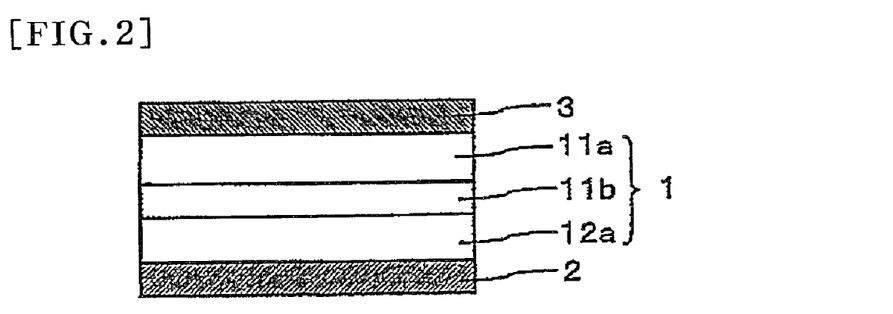
FIG. 2 is a cross-sectional view showing an example of the transparent conductive film of the present invention.
Figure 3:
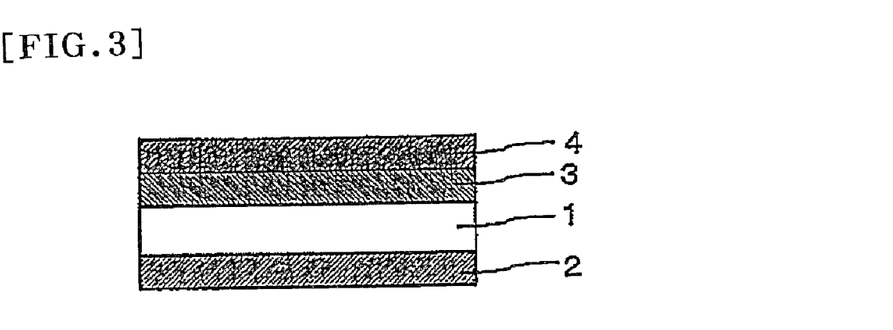
FIG. 3 is a cross-sectional view showing an example of the transparent conductive film of the present invention.
Figure 4:
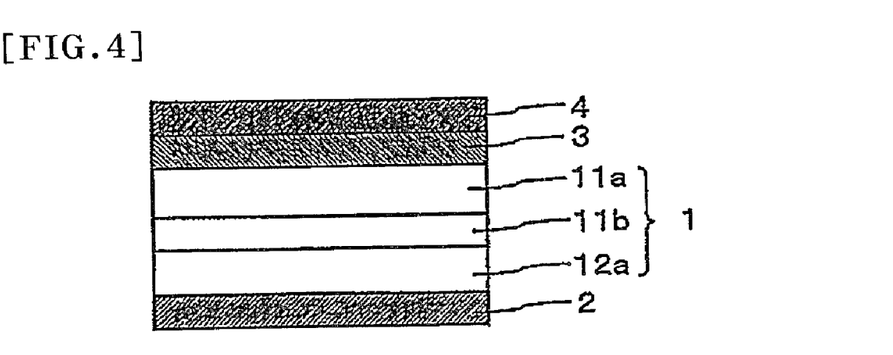
FIG. 4 is a cross-sectional view showing an example of the transparent conductive film of the present invention.

In FIG. 1, a single piece of transparent film substrate is used as the transparent film substrate 1. FIG. 2 shows another example where a laminate 1 of a transparent film substrate 11a and another transparent film substrate 12a bonded to each other with a pressure-sensitive adhesive layer 11b interposed therebetween is used in place of the transparent film substrate 1 of the transparent conductive film of FIG. 1. While two transparent film substrates are laminated in FIG. 2, three or more transparent film substrates may be laminated. In the present invention, such a laminate may be used as the transparent film substrate 1. FIG. 3 shows an example where an antireflection layer 4 is further provided on the hard-coating layer 3 of the transparent conductive film of FIG. 1. FIG. 4 shows an example where an antireflection layer 4 is further provided on the hard-coating layer 3 of the transparent conductive film of FIG. 2.

The transparent film substrate 1 for use in the transparent conductive film of the present invention may be a single piece of transparent film substrate or a laminate of two or more pieces of transparent film substrates bonded to one another with a pressure-sensitive adhesive layer interposed therebetween.

The materials for the transparent film substrate 1 are not particularly limited, and any appropriate material can be selected and used. Concretely, polyester-based resins, acetate-based resins, polyether sulfone-based resins, polycarbonate-based resins, polyamide-based resins, polyimide-based resins, polyolefin-based resins, (meth) acryl-based resins, polyvinyl chloride-based resins, polyvinylidene chloride-based resins, polystyrene-based resins, polyvinyl alcohol-based resins, polyarylate-based resins, polyphenylene sulfide-based resins, and the like can be cited. From among these, polyester-based resins, polycarbonate-based resins and polyolefin-based resins are particularly preferable.

The refractive index of the film substrate 1 is generally, but not limited to, from about 1.30 to 1.80, preferably from 1.40 to 1.70.

It is preferable for the thickness of the film substrate 1 to be approximately 75 µm to 400 µm. It is more preferable for it to be 100 µm to 200 µm. In the case where the thickness of the first film substrate is smaller than 75 µm, there are problems with the durability and the processability. In the case where the thickness of the film substrate 1 is greater than 400 µm, the touch panel portion becomes large, and in addition, application of a heavy load becomes necessary, due to the input properties of the touch panel, which is not preferable.

In addition, in the case where the film substrate 1 is a multilayer body of two or more transparent film substrates, an appropriate thickness and material can be selected for the respective film substrates, and it is preferable for at least one to be 20 µm to 125 µm.

In the case where the transparent film substrate 1 is a multilayer body of transparent film substrates, any pressure-sensitive adhesive layer may be used, without any particular limitations, as long as it is transparent. Acryl-based pressure-sensitive adhesives, silicone-based pressure-sensitive adhesives and rubber-based pressure-sensitive adhesives, for example, can be used. The pressure-sensitive adhesive layer has a function of improving the scratch resistance of the transparent conductive thin layer 2 which is provided on one surface of the film substrate 1, as well as properties of resistance against pressure at localized points for the touch panel due to the cushioning effects after the laminating of the film substrates. It is preferable for the modulus of elasticity of the pressure-sensitive adhesive layer to be in a range from 1 to 100 N/cm$^2$, and for the thickness to be set to 1 µm or more, more so in a range from 5 to 100 µm.

In the case where the above described modulus of elasticity is less than 1 N/cm$^2$, the pressure-sensitive adhesive layer becomes inelastic, and therefore, easily deforms when pressure is applied, so as to make the film substrate 1, and in addition, the transparent conductive thin layer 2, uneven, it becomes easy for the pressure-sensitive adhesive to stick out from the end surface which is created in the cutting process, and furthermore, the effects of improving the scratch resistance of the transparent conductive thin layer 2 and tap properties for touch panel are reduced. Meanwhile, in the case where the modulus of elasticity exceeds 100 N/cm$^2$, the pressure-sensitive adhesive layer becomes hard and cushioning effects cannot be expected for the pressure-sensitive adhesive layer, and therefore, the scratch resistance of the transparent conductive thin layer 2 and the tap properties for touch panel cannot be improved. In addition, in the case where the thickness of the pressure-sensitive adhesive layer is less than 1 µm, cushioning effects cannot be expected for the pressure-sensitive adhesive layer, and therefore, the scratch resistance of the conductive thin layer and the tap properties for touch panel cannot be expected to improve. Conversely, in the case where the thickness is great, transparency is lost, and sometimes formation of the pressure-sensitive adhesive layer or pasting of the film substrates becomes difficult, and no good results are gained in terms of cost.

An adhesion facilitating treatment layer may be formed on the surface of the transparent film substrate 1 such that its adhesion to the hard-coating layer 3 or the transparent conductive thin layer 2 can be improved. The adhesion facilitating treatment layer may be formed by previously subjecting the surface of the transparent film substrate 1 to an etching process such as sputtering, corona discharge, plasma treatment, flame treatment, ultraviolet irradiation, electron beam irradiation, chemical treatment, and oxidation, or an undercoating process. If necessary, the transparent film substrate may also be subjected to dust removing or cleaning by solvent cleaning, ultrasonic cleaning or the like, before the hard-coating layer 3 or the transparent conductive thin layer 2 is formed thereon. The formation of the adhesion facilitating treatment layer is particularly effective in forming the hard-coating layer 3.

The material which is used in the formation of the transparent conductive thin layer 2 is not particularly limited, and any appropriate material from which a transparent and conductive layer can be formed can be selected for use. Metals, such as gold, silver, platinum, palladium, copper, aluminum, nickel, chromium, titanium, iron, cobalt, tin and alloys of these, metal oxides, such as indium oxide, tin oxide, titanium oxide, cadmium oxide and mixtures of these, and other metal compounds, such as copper iodine, for example, can be used. The transparent conductive thin layer may be either a crystalline layer or a non-crystalline layer. Indium oxide containing tin oxide, tin oxide containing antimony and the like are preferably used as the above described material.

As for the method for forming the transparent conductive thin layer 2, an appropriate method for forming a thin layer can be selected from among a variety of methods, such as a vacuum vapor deposition method, a sputtering method, an ion plating method, a spray thermal decomposition method, a chemical plating method, an electrical plating method and a method where any of these are combined. It is preferable to adopt a vacuum vapor deposition method or a sputtering method as the above described method for forming a thin layer, from the point of view of speed of formation for the conductive thin layer, the possibility of forming a film having a large area, productivity and the like.

An appropriate thickness can be determined for the transparent conductive thin layer 2 in accordance with the purpose when used. The thickness is usually 10 to 300 nm, preferably in a range of 10 to 200 nm, further preferably in a range of 15 to 50 nm. It is preferable that the transparent conductive thin layer 2 is a continuous coating film having such a good conductivity that the surface electrical resistance is no higher than $1 \times 10^3 \Omega/\square$.

Although not shown in FIGS. 1 to 4, the transparent conductive thin layer 2 may be formed on the substrate with an anchor layer interposed therebetween. One or more anchor layers may be provided. The anchor layer may be made of an inorganic material, an organic material or a mixture of inorganic and organic materials. The formation of the anchor layer can improve adhesion between the transparent film substrate 1 and the transparent conductive thin layer 2 and is effective in improving the scratch resistance or bending resistance of the transparent conductive thin layer and in improving tap properties for touch panels.

For example, an inorganic material such as $SiO_2$, $MgF_2$ or $Al_2O_3$ is preferably used to form the anchor layer. Examples of the organic material include acrylic resins, urethane resins, melamine resins, alkyd resins, and siloxane polymers. In particular, a thermosetting resin comprising a mixture of a melamine resin, an alkyd resin and an organosilane condensate is preferably used as the organic material.

The anchor layer may be formed with any of the above materials by vacuum deposition, sputtering, ion plating, coating, or the like.

The anchor layer generally has a thickness of 100 nm or less, preferably of about 15 to 100 nm, more preferably of 20 to 60 nm.

The hard-coating layer 3 is made from a hard-coating material comprising an urethane acrylate (A), a polyol (meth) acrylate (B) and a (meth)acrylic polymer (C) having an alkyl group containing two or more hydroxyl groups.

The urethane acrylate (A) may comprise components derived from (meth)acrylic acid and/or its ester, a polyol, and a diisocyanate. For example, the urethane acrylate is prepared by a process including the steps of making a hydroxy(meth) acrylate having at least one hydroxyl group from (meth) acrylic acid and/or its ester and a polyol and allowing the hydroxy(meth)acrylate to react with a diisocyanate. The term "(meth)acrylic acid" means acrylic acid and/or methacrylic acid, and "(meth)" has the same meaning with respect to the invention. Each of these components may be of a single type or a combination of two or more types.

Examples of esters of (meth)acrylic acid include alkyl (meth)acrylates such as methyl(meth)acrylate, ethyl(meth) acrylate, propyl (meth)acrylate, isopropyl(meth)acrylate, and butyl(meth)acrylate; and cycloalkyl(meth)acrylates such as cyclohexyl(meth)acrylate.

The polyol is a compound having at least two hydroxyl groups. Examples of the polyol include ethylene glycol, 1,3-propylene glycol, 1,2-propylene glycol, diethylene glycol, dipropylene glycol, neopentyl glycol, 1,3-butanediol, 1,4-butanediol, 1,6-hexanediol, 1,9-nonanediol, 1,10-decaneglycol, 2,2,4-trimethyl-1,3-pentanediol, 3-methyl-1,5-pentanediol, neopentylglycol hydroxypivalate ester, cyclohexane dimethylol, 1,4-cyclohexanediol, spiroglycol, tricyclodecane methylol, hydrogenated bisphenol A, ethylene oxide-added bisphenol A, propylene oxide-added bisphenol A, trimethylolethane, tri(di)methylolpropane, glycerin, 3-methylpentane-1,3,5-triol, pentaerythritol, dipentaerythritol, tripentaerythritol, and glucoses.

The diisocyanate may be any type of aromatic, aliphatic or alicyclic diisocyanate. Examples of the diisocyanate include tetramethylene diisocyanate, hexamethylene diisocyanate, isophorone diisocyanate, 2,4-tolylene diisocyanate, 4,4-diphenyl diisocyanate, 1,5-naphthalene diisocyanate, 3,3-dimethyl-4,4-diphenyl diisocyanate, xylene diisocyanate, trimethyl hexamethylene diisocyanate, 4,4-diphenylmethane diisocyanate, and hydrogenated derivatives thereof.

Too small addition amounts of the urethane acrylate (A) lead to a reduction in flexibility or adhesion of the resulting hard-coating layer, while too large addition amounts thereof lead to a reduction in hardness of the hard-coating layer after curing. In all the resin components of the hard-coating material (the total amount of Components A, B and C and optionally an additional resin material(s) and the like), therefore, the content of the urethane acrylate (A) is preferably from 15% by weight to 55% by weight, more preferably from 25% by weight to 45% by weight. If the content of the urethane acrylate (A) in all the resin components of the hard-coating material is more than 55% by weight, the hard coating performance can be degraded in some unfavorable cases. If the content is less than 15% by weight, flexibility or adhesion cannot be improved in some unfavorable cases.

Examples of the component of the polyol (meth)acrylate (B) include pentaerythritol di(meth)acrylate, pentaerythritol tri(meth)acrylate, pentaerythritol tetra(meth)acrylate, dipentaerythritol hexa(meth)acrylate, and 1,6-hexanediol (meth) acrylate. A particularly preferred polyol (meth)acrylate contains a monomer component comprising a polymer of pentaerythritol triacrylate and pentaerythritol tetraacrylate. A component mixture containing pentaerythritol triacrylate and pentaerythritol tetraacrylate is also particularly preferred.

Based on the amount of the urethane acrylate (A), the blending amount of the polyol (meth)acrylate (B) is preferably from 70% by weight to 180% by weight, more preferably from 100% by weight to 150% by weight. If the blending amount of the polyol (meth)acrylate (B) is more than 180% by weight based on the amount of the urethane acrylate (A), hardening and shrinking of the hard-coating layer can be significant so that the hard-coated film can significantly curl or its flexibility can be reduced in some unfavorable cases. If the amount is less than 70% by weight, the hard coating properties such as hardness and scratch resistance can be degraded in some unfavorable cases. Practically, the scratch resistance value should preferably in the range of 0 to 0.7, more preferably in the range of 0 to 0.5. If the blending amount of the polyol (meth)acrylate (B) is within the above range, the scratch resistance value can be set within the stated range. How to calculate the scratch resistance value will be described later in the section of Examples.

The (meth)acrylic polymer (C) has an alkyl group containing two or more hydroxyl groups. More specifically, the (meth)acrylic polymer (C) may be a (meth)acrylic polymer having a 2,3-dihydroxypropyl group, which is represented by Chemical Formula (1) below, or a (meth)acrylic polymer having a 2-hydroxyethyl group and a 2,3-dihydroxypropyl group, whose molecule has a repeating unit in Chemical Formula (1) below and another repeating unit represented by Chemical Formula (2) below.

Based on the amount of the urethane acrylate (A), the addition amount of the (meth)acrylic polymer (C) having an alkyl group containing two or more hydroxyl groups is preferably from 25% by weight to 110% by weight, more preferably from 45% by weight to 85% by weight. If the amount is more than 110% by weight, the coating properties can be degraded in some unfavorable cases. If the amount is less than 25% by weight, curling can significantly increase in some unfavorable cases.

According to the invention, the component of the (meth) acrylic polymer (C) allows suppression of hardening and shrinking of the hard-coating layer 3 and thus leads to the prevention of curling. In view of the production of the transparent conductive film and the like, curling should preferably be controlled within 30 mm or less. If curling is controlled within such a range, workability and production efficiency can be further improved.

The outer surface of the hard-coating layer 3 may have a fine unevenness structure so as to have antiglare properties. Any appropriate method may be used to form a fine unevenness structure at the surface. For example, there is a method including the step of adding and dispersing fine particles into the hard-coating layer 3 to form a fine unevenness structure.

The fine particles to be added may be inorganic or organic fine particles. The inorganic fine particles may be made of any material such as silicon oxide, titanium oxide, aluminum oxide, zinc oxide, tin oxide, calcium carbonate, barium sulfate, talc, kaolin, and calcium sulfate. The organic fine particles may also be any material such as polymethyl methacrylate acrylate-based resin powder, silicone-based resin powder, polystyrene-based resin powder, polycarbonate-based resin powder, acrylic-styrene-based resin powder, benzoguanamine-based resin powder, melamine-based resin powder, polyolefin-based resin powder, polyester-based resin powder, polyamide-based resin powder, polyimide-based resin powder, and polyethylene fluoride-based resin powder.

The fine particles may have any shape and may be in the form of spherical beads or may be of indefinite shape such as powder. A single type or two or more types of fine particles may be appropriately selected and used. The fine particles may have an average particle size of 1 to 30 μm, preferably of 2 to 20 μm. For the purpose of controlling refractive index or imparting conductivity, ultrafine particles of metal oxide or the like may be dispersed in the fine particles, or the fine particles may be impregnated with ultrafine particles of metal oxide or the like.

The blending amount of the inorganic fine particles or the organic fine particles may be set at any appropriate value without any particular limitation. Specifically, when an antiglare effect is required to impart, based on 100 parts by weight of the hard-coating material, the amount of the fine particles is preferably from 2 to 70 parts by weight, more preferably from 4 to 50 parts by weight, particularly preferably from 15 to 40 parts by weight.

The ultrafine particles preferably have particle sizes of 100 nm or less. The ultrafine particles with particle sizes of 100 nm or less have the function of adjusting the apparent refractive index of the hard-coating layer 3 depending on the amount thereof. The refractive index of the film substrate 1 is preferably close to that of the hard-coating layer 3. A large difference between the refractive indices of the film substrate 1 and the hard-coating layer 3 can cause a phenomenon, so called interference fringes, in which external light incident on the transparent conductive film is reflected to produce rainbow color so that display quality can be degraded. In offices, which are environments where touch panels comprising transparent conductive films are used, the use of three-wavelength fluorescent lamps having strong emission intensities at specific wavelengths and featuring clear visibility of objects is increasing remarkably, and it is known that the interference fringes more significantly appear under such three-wavelength fluorescent lamps.

The average particle size of the fine particles is preferably from 30% to 75% of the thickness of the hard-coating layer 3, more preferably from 30% to 50% of the thickness thereof. If the average particle size is less than 30% of the thickness, in some cases, sufficient unevenness cannot be formed at the surface so that a sufficient antiglare function cannot be provided. On the other had, if the average particle size is more than 75% of the thickness, in some cases, the steps of the surface unevenness can be so large that the appearance can be degraded, or in some cases, reflected light can be strongly scattered to produce white blurring.

In order to reduce light scattering on the interface between the fine particles and the hard-coating layer 3 as much as possible, the difference between the refractive indexes of the fine particles and the hard-coating layer 3 should be small. The hard-coating layer 3 generally has a refractive index of 1.4 to 1.6. Thus, as the fine particles, it is preferable to use organic fine particles with a refractive index close to that of the hard-coating layer 3 or inorganic silicon oxide fine particles with a refractive index close to that of the hard-coating layer 3. The difference between the refractive indexes of the hard-coating layer 3 and the fine particles is preferably less than 0.05. If the difference is 0.05 or more, light scattering can be strong, so that failures such as unsharpness of displayed contents can occur, for example, in the case of applications in image displays.

The fine particles preferably have a substantially spherical shape with an aspect ratio of at most 1.5. Substantially spherical or polygonal particles with an aspect ratio of more than 1.5 can complicate the control of the unevenness θa formed of the fine particles in some cases.

The average tilt angle θa of the hard-coating layer 3 needs to be from 0.4° to 1.5°. If θa is less than 0.4°, sufficient antiglare properties cannot be produced, and outside light or the like can disadvantageously cause glare. On the other hand, if θa is more than 1.5°, the haze value can disadvantageously increase. Within the above range, the hard-coating layer 3 can provide an improved antiglare effect and appropriately block outside light or like from glare. The average tilt angle θa is a value obtained by the method according to JIS B 0601.

The difference (d) between the refractive indexes of the film substrate 1 and the hard-coating layer 3 is preferably 0.04 or less, more preferably 0.02 or less. When a polyethylene terephthalate film with a refractive index of about 1.64 is used as the film substrate 1, about 35% of titanium oxide ultrafine particles with particle sizes of 100 nm or less in all the resin components of the hard-coating material can control d to 0.02 or less and prevent the occurrence of interference fringes.

When a triacetyl cellulose film with a refractive index of about 1.48 is used as the film substrate 1, about 40% of silicon oxide ultrafine particles with particle sizes of at most 100 nm in all the resin components of the hard-coating material can similarly control d to 0.02 or less and prevent the occurrence of interference fringes.

When an outer surface of the hard-coating layer 3 has unevenness and is imparted antiglare properties, the thickness of the hard-coating layer 3 is preferably from 15 to 35 μm, more preferably from 15 to 30 μm. Even at a lower limit of thickness of 15 μm, the hard-coating layer 3 using the polyol (meth)acrylate (B) can retain at least a certain level of hardness (for example, a pencil hardness of at least 4H). Even at an upper limit of thickness of 35 μm for a further increase in hardness, if the hard-coating layer 3 includes non-hardening and shrinking fine particles, the hard-coating layer 3 can be sufficiently prevented from curling, cracking or the like. If the thickness is less than 15 μm, the hardness of the hard-coating layer 3 can be degraded. On the other hand, a thickness of more than 35 μm can cause a practical problem in which the hard-coating layer 3 itself can be cracked, or the hard-coated film 3 can curl toward the hard-coating surface side due to hardening and shrinking of the hard-coating layer. The thickness of the hard-coating layer 3 having unevenness at the outer surface means the maximum thickness of the layer including the bump portions as well.

The hard-coating layer 3 may be formed by a process including the steps of applying a solution of the hard coating material in a diluent solvent to one side of the transparent film substrate 1 to form a coating film and then curing the coating film.

Various types of solvents may be used as the dilution solvent for the hard-coating material. Examples of such solvents include dibutyl ether, dimethoxymethane, dimethoxyethane, diethoxyethane, propylene oxide, 1,4-dioxane, 1,3-dioxolane, 1,3,5-trioxane, tetrahydrofuran, acetone, methyl ethyl ketone, diethyl ketone, dipropyl ketone, diisobutyl ketone, cyclopentanone, cyclohexanone, methylcyclohexanone, ethyl formate, propyl formate, n-pentyl formate, methyl acetate, ethyl acetate, methyl propionate, ethyl propionate, n-pentyl acetate, acetyl acetone, diacetone alcohol, methyl acetoacetate, ethyl acetoacetate, methanol, ethanol, 1-propanol, 2-propanol, 1-butanol, 2-butanol, 1-pentanol, 2-methyl-2-butanol, cyclohexanol, isobutyl acetate, methyl isobutyl ketone, 2-octanone, 2-pentanone, 2-hexanone, 2-heptanone, and 3-heptanone. One of these solvents or any combination of two or more of these solvents may be used. The content of ethyl acetate in all the dilution solvents is preferably 20% by weight or more, more preferably 25% by weight or more, particularly preferably from 30% by weight to 70% by weight. When triacetyl cellulose is used for the film substrate 1, such a content of ethyl acetate allows the production of a hard-coating layer 3 with particularly high adhesion. If the content of ethyl acetate in all the dilution solvents is more than 70% by weight, the rate of volatilization can be high so that unevenness in coating or drying can easily occur. If the content is less than 20% by weight, the adhesion to the substrate can be degraded in some unfavorable cases.

Various types of leveling agents may be added to the hard-coating material. The leveling agent may be appropriately a fluorochemical or silicone leveling agent, more preferably a silicone leveling agent such as a reactive silicone, polydimethylsiloxane, polyether-modified polydimethylisloxane, and polymethylalkylsiloxane. Among these silicone leveling agents, the reactive silicone is particularly preferred. The reactive silicone added can impart lubricity to the surface and produce continuous scratch resistance. When an antireflection layer containing a siloxane component is used, a hydroxyl-containing reactive silicone can increase adhesion.

For example, the reactive silicone leveling agent may be a compound having a siloxane bond and an acrylate group and a hydroxyl group. Specific examples of such a compound include:

(1) copolymers of dimethylsiloxane/methyl, 3-acryloyl-2-hydroxypropoxypropylsiloxane/methyl, and 2-acryloyl-3-hydroxypropoxypropylsiloxane (0.8:0.16:0.04 in molar ratio);

(2) copolymers of dimethylsiloxane, hydroxypropylsiloxane, (6-isocyanate-hexyl)isocyanuric acid, and aliphatic polyester (6.3:1.0:2.2:1.0 in molar ratio); and (3) copolymers of dimethylsiloxane, acrylate-terminated methyl polyethylene glycol propyl ether siloxane, and hydroxyl-terminated methyl polyethylene glycol propyl ether siloxane (0.88:0.07:0.05 in molar ratio).

The blending amount of the leveling agent is preferably at most 5 parts by weight, more preferably in the range of 0.01 to 5 parts by weight, based on 100 parts by weight of all the resin components of the hard-coating material.

In a case where ultraviolet light is used to cure the hard-coating material, the leveling agent oriented in the hard-coating material can bleed to the air interface during the steps of pre-drying and drying off the solvent so that the effect of inhibiting curing of UV-curable resin by oxygen can be blocked and that a hard-coating layer 3 having sufficient hardness even at the uppermost surface can be obtained. The silicone leveling agent can also bleed to the surface of the hard-coating layer 3 to provide lubricity and thus can increase scratch resistance.

If necessary, the material for forming the hard-coating layer 3 may contain a pigment, a filler, a dispersing agent, a plasticizer, a ultraviolet absorbing agent, a surfactant, an antioxidant, a thixotropy-imparting agent, or the like, as long as the performance is not degraded. One of these additives may be used alone, or two or more of these additives may be used together.

In an embodiment of the invention, the hard-coating material may contain any conventional photopolymerization initiator. Examples of applicable initiators include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N,N,N',N'-tetramethyl-4,4'-diaminobenzophenone, 1-(4-isopropylphenyl)-2-hydroxy-2-methylpropane-1-one, and other thioxanthone compounds.

A process of forming the hard-coating layer 3 includes the steps of applying, to the film substrate 1, the hard-coating material that contains at least the urethane acrylate (A), the polyol (meth)acrylate (B) and the (meth)acrylic polymer (C) having an alkyl group containing two or more hydroxyl groups, and then curing the material. The hard-coating material may be applied in the form of a solvent solution. The applied solution of the hard-coating material is dried and then cured.

The hard-coating material may be applied to the film substrate 1 by any conventional coating method such as fountain coating, die coating, spin coating, spray coating, gravure coating, roll coating, and bar coating.

While the hard-coating material may be cured by any method, ionizing radiation curing is preferably used. While any type of activation energy may be used for such curing, ultraviolet light is preferably used. Preferred examples of the energy radiation source include high-pressure mercury lamps, halogen lamps, xenon lamps, metal halide lamps, nitrogen lasers, electron beam accelerators, and radioactive elements. The amount of irradiation with the energy radiation source is preferably from 50 to 5000 mJ/cm$^2$ in terms of accumulative exposure at an ultraviolet wavelength of 365 nm. If the amount of irradiation is less than 50 mJ/cm$^2$, curing can be insufficient so that the hardness of the hard-coating layer can be degraded in some cases. Beyond 5000 mJ/cm$^2$, the hard-coating layer can be colored and have reduced transparency in some cases.

As shown in FIG. 3, 4, an antireflection layer 4 may be formed on the hard-coating layer 3. FIGS. 2, 4 are cross-sectional views schematically showing transparent conductive films according to an embodiment of the invention. Light incident on an object undergoes reflection on the interface, absorption and scattering in the interior and any other phenomena until it goes through the object and reaches the back side. Light reflection at the interface between air and a hard-coating layer is one of the factors in the reduction in visibility of the image on a touch panel equipped with the transparent conductive film. The antireflection layer 4 reduces such surface reflection. The antireflection layer 4 may comprise two or more layers.

The antireflection layer 4 may be a thin optical film that is stacked on the surface of the hard-coating layer 3 so as to have strictly controlled thickness and refractive index. In this technique, the antireflection function is produced by allowing opposite phases of incident light and reflected light to cancel each other out based on interference of light.

When the antireflection layer 4 is designed based on interference of light, the interference effect can be enhanced by a method of increasing the difference between the refractive indexes of the antireflection layer 4 and the hard-coating layer 3. A laminate of two to five thin optical films (each with strictly controlled thickness and refractive index) may be stacked on a substrate to form an antireflection multilayer. In such a case, components of different refractive indexes are generally used to form a plurality of layers with a certain thickness. Thus, the antireflection layer 4 can be optically designed at a higher degree of freedom, the antireflection effect can be enhanced, and it may be possible to make the spectral reflection characteristics flat in the visible light range. Since each layer of the thin optical film must be precise in thickness, a dry process such as vacuum deposition, sputtering, and CVD is generally used to form each layer.

The hard-coating material may use titanium oxide, zirconium oxide, silicon oxide, magnesium fluoride, or the like. In order to produce a more significant antireflection function, a laminate of a titanium oxide layer(s) and a silicon oxide layer(s) is preferably used. Such a laminate is preferably a two-layer laminate comprising a high-refractive-index titanium oxide layer (refractive index: about 1.8), which is formed on the hard-coating layer, and a low-refractive-index silicon oxide layer (refractive index: about 1.45), which is formed on the titanium oxide layer. Also preferred is a four-layer laminate comprising the two-layer laminate and a titanium oxide layer and a silicon oxide layer formed in this order on the two-layer laminate. The antireflection layer of such a two- or four-layer laminate can evenly reduce reflection over the visible light wavelength range (380 to 780 nm).

The antireflection effect can also be produced by stacking a thin monolayer optical film on the film substrate 1. In the design of a single antireflection layer 4, the difference between the refractive indexes of the antireflection layer 4 and the hard-coating layer 3 should be large for the maximum antireflection function. Concerning the thickness (d) of the antireflection layer 4, the refractive index (n) and the wavelength ($\lambda$) of incident light, the relation nd=$\lambda$/4 is established. If the antireflection layer 4 is a low-refractive-index layer having a refractive index lower than that of the film substrate 1, its reflectance can be minimum under the conditions that the relation should be established. For example, if the refractive index of the antireflection layer 4 is 1.45, the antireflection layer 4 with a thickness of 95 nm can have a minimum reflectance at a wavelength of 550 nm with respect to an incident beam of visible light.

The antireflection function should be produced in the visible light wavelength range of 380 to 780 nm, and the visibility is particularly high in the wavelength range of 450 to 650 nm. The layer is generally designed to have a minimum reflectance at the center wavelength 550 nm of the range.

In the design of a single antireflection layer 4, its thickness accuracy may be less strict than that of the antireflection multilayer and may be in the range of the design thickness ±10%. In a case where the design thickness is 95 nm, for example, the layer with a thickness in the range of 86 nm to 105 nm can be used without problems. Thus, a single antireflection layer 4 is generally formed using a wet process such as fountain coating, die coating, spin coating, spray coating, gravure coating, roll coating, and bar coating.

Examples of the material for forming a single antireflection layer 4 include resin materials such as UV-curable acrylic resins; hybrid materials such as a dispersion of inorganic fine particles (such as colloidal silica) in a resin; and sol-gel materials using metal alkoxide such as tetraethoxysilane and titanium tetraethoxide. Any of these materials may be used together with a fluoro-compound for imparting anti-fouling surface properties. In terms of scratch resistance, low-refractive-index layer materials with a high content of an inorganic component tend to provide good performance, and sol-gel materials are particularly preferred. Partial condensates of sol-gel materials may be used.

The sol-gel fluoro-substance may be typically perfluoroalkylalkoxysilane such as a compound represented by the general formula: $CF_3(CF_2)_nCH_2CH_2Si(OR)_3$, wherein R represents an alkyl group of 1 to 5 carbon atoms, and n represents an integer of 0 to 12. Specific examples include trifluoropropyltrimethoxysilane, trifluoropropyltriethoxysilane, tridecafluorooctyltrimethoxysilane, tridecafluorooctyltriethoxysilane, heptadecafluorodecyltrimethoxysilane, and heptadecafluorodecyltriethoxysilane. In particular, the compounds whose n is from 2 to 6 are preferred.

The low-refractive-index layer (the antireflection layer) is preferably produced with a hard-coating material that contains, as disclosed in JP-A No. 2004-167827, a siloxane oligomer with an ethylene glycol-equivalent number average molecular weight of 500 to 10000 and a fluorine compound having a polystyrene-equivalent number average molecular weight of at least 5000 and having a fluoroalkyl structure and a polysiloxane structure.

The low-refractive-index layer (the antireflection layer) may contain an inorganic sol for increasing film strength. While any inorganic sol material may be used such as silica, alumina, and magnesium fluoride, silica sol is particularly preferred. The amount of the inorganic sol is appropriately set within the range of 10 to 80 parts by weight, based on 100 parts of the total solids of the low-refractive-index-coating material. The particle size of the inorganic sol is preferably in the range of 2 to 50 nm, more preferably of 5 to 30 nm.

The material for forming the antireflection layer 4 preferably contains hollow spherical silicon oxide ultrafine particles. The hollow spherical silicon oxide ultrafine particles preferably have an average particle size of 5 to 300 nm. Such ultrafine particles are like hollow spheres each comprising a pore-containing outer shell in which a hollow is formed. The hollow may contain a solvent and/or a gas which are left after the fine particles are prepared. A precursor substance for forming the hollow is preferably left in the hollow. The thickness of the outer shell is preferably in the range of about 1 to 50 nm and in the range of about 1/50 to 1/5 of the average particle size. The outer shell preferably comprises a plurality of coating layers. The pore is preferably blocked, and the hollow is preferably sealed with the outer shell. The antireflection layer 4 holding a porous structure or a hollow can have a reduced refractive index and thus is preferably used.

The hollow spherical silicon oxide ultrafine particles should have an average particle size of about 5 to 300 nm. If the average particle size is less than 5 nm, the volume fraction of the outer shell in the spherical fine particles can be higher and thus the volume fraction of the hollow can be lower. If the average particle size is more than 300 nm, it may be difficult to prepare a stable dispersion, and the ultrafine particle-containing antireflection layer can tend to have reduced transparency. The hollow spherical silicon oxide ultrafine particles preferably have an average particle size in the range of 10 to 200 nm. The average particle size may be determined by dynamic light scattering.

For example, a method of producing hollow spherical silicon oxide ultrafine particles includes the steps (a) to (c) as described below. The hollow spherical silicon oxide ultrafine particles may be prepared in the form of a dispersion. For example, the method of producing such hollow spherical silicon oxide ultrafine particles is preferably a method of producing silica fine particles as disclosed in JP-A No. 2000-233611. Specifically, the method includes the step of:

(a) simultaneously adding an aqueous silicate solution and/or an acidic silicic acid solution and an aqueous solution of an alkali-soluble inorganic compound to an aqueous alkali solution with a pH of 10 or more or an aqueous alkali solution with a pH of 10 or more in which seed particles are optionally dispersed, in order to form a dispersion of core particles with a $MO_x/SiO_2$ molar ratio of 0.3 to 1.0, wherein $SiO_2$ represents silicon oxide, and $MO_x$ represents inorganic compounds other than silicon oxide;

(b) adding a source of silicon oxide to the dispersion of core particles to form a first silicon oxide coating layer on the core particles; and (c) adding an acid to the dispersion so as to partially or entirely remove an element constituting the core particles.

In the invention, the hollow spherical silicon oxide ultrafine particles should have an average particle size of 5 to 300 nm. If the average particle size is less than 5 nm, the volume fraction of the outer shell in the spherical fine particles can be higher and thus the volume fraction of the hollow can be lower. If the average particle size is more than 300 nm, it may be difficult to prepare a stable dispersion, and the ultrafine particle-containing antireflection layer can tend to have reduced transparency. The hollow spherical silicon oxide ultrafine particles preferably have an average particle size in the range of 10 to 200 nm. The average particle size may be determined by dynamic light scattering.

A dispersion of the hollow spherical silicon oxide ultrafine particles may be mixed with any type of matrix component to form an antireflection coating liquid. The term "any type of matrix component" refers to any component capable of forming a coating film on the surface of the hard-coating layer. The matrix may be selected and used from resins and the like satisfying the requirements for adhesion to the substrate, hardness, coating properties, and the like. Examples of such a matrix include conventional organic resins such as polyester resins, acrylic resins, urethane resins, vinyl chloride resins, epoxy resins, melamine resins, fluororesins, silicone resins, butyral resins, phenol resins, vinyl acetate resins, UV-curable resins, electron beam-curable resins, emulsion resins, water-soluble resins, hydrophilic resins, any mixtures thereof, any copolymers thereof, and any modifications thereof. The hydrolyzable organic silicon compounds as illustrated for the single antireflection layer 4 may also be used as the matrix component.

When the organic resin is used as the matrix component, for example, the matrix and an organic solvent dispersion of hollow spherical silicon oxide ultrafine particles, which uses an organic solvent such as an alcohol in place of water as a dispersion medium, or the matrix and an organic solvent dispersion of the ultrafine particles which has been optionally treated with any conventional coupling agent are diluted with any appropriate organic solvent to form an antireflection coating liquid.

When the hydrolyzable organic silicon compound is used as the matrix component, for example, water and a catalyst of an acid or alkali are added to a liquid mixture of an alkoxysilane and an alcohol to form a partially hydrolyzed product of the alkoxysilane, which is then mixed with the above-mentioned dispersion and optionally diluted with an organic solvent to form a coating liquid.

In the coating liquid, the weight ratio of the silicon oxide ultrafine particles to the matrix component is preferably in the range of 1:99 to 9:1. If the weight ratio exceeds 9:1, the antireflection layer can be insufficient in strength and impractical in some cases. If the weight ratio is less than 1:99, the addition of the silicon oxide ultrafine particles cannot be so effective in some cases.

The refractive index of the antireflection layer 4 formed on the surface of the hard-coating layer 3 may be as low as from 1.2 to 1.42 depending on the mixture ratio between the silicon oxide ultrafine particles and the matrix component or the like and the refractive index of the matrix used. The refractive index of the silicon oxide ultrafine particles themselves may be from 1.2 to 1.38 in the invention.

The transparent conductive film having the antireflection layer 4 formed on the hard-coating layer 3 of the hard-coated film is preferred in terms of pencil hardness. The surface of the ultrafine particle-containing hard-coating layer 3 has fine unevenness, which may have an effect on pencil drawing (the pencil can tend to scratch the surface, and the force can tend to be exerted). If the antireflection layer 4 is provided, the unevenness can be smoothed out, and the pencil hardness of the hard-coating layer can be increased from a usual value (such as about 3H) to 4H.

For example, the hollow spherical silicon oxide ultrafine particles are preferably prepared using the method of producing silica fine particles as disclosed in JP-A No. 2000-233611.

In the process of forming the antireflection layer 4, while drying and curing may be performed at any temperature, they are generally performed at a temperature of 60 to 150° C., preferably of 70 to 130° C., generally for a time period of 1 minute to 30 minutes, more preferably of about 1 minute to about 10 minutes in view of productivity. After drying and curing, the layer may be further heated so that a transparent conductive film of high hardness can be obtained. While the heating may be performed at any temperature, it is generally performed at a temperature of 40 to 130° C., preferably of 50 to 100° C., generally for a time period of 1 minute to 100 hours, more preferably of at least 10 hours in terms of further increasing scratch resistance. The temperature and the time period are not limited to the above range and may be adjusted as needed. The heating is appropriately performed by a method using a hot plate, an oven, a belt furnace, or the like.

The antireflection layer 4 may be more frequently attached to the uppermost surface of image displays and thus tends to receive stains from the external environment. Particularly, general stains such as fingerprint, thumbmark, sweat, and hair dressing are frequently left. The stain deposit can change the surface reflectance or stand out whitely to make the displayed content unclear. Such stains can be more noticeable on the layer than on a simple transparent plate or the like. In such a case, a fluoro-silane compound, a fluoro-organic compound or the like may be layered on the antireflection layer 4 in order to impart the function of anti-deposition or easy elimination.

In addition, if necessary, an antifouling layer may be formed on the hard-coating layer 3 in order to impart pen slide properties or antifouling properties. Resins such as fluororesins, silicone resins, melamine resins, and acrylic resins, silane coupling agents, waxes, and the like are preferably used for the antifouling layer. The antifouling layer may be formed using known conventional methods such as wet processes such as reverse coating, die coating and gravure coating, and dry processes such as CVD. The antifouling layer may also serves as an antireflection layer. The thickness of the antifouling layer is generally from 1 to 50 nm, preferably from 1 to 30 nm. The antifouling layer may be formed on the hard-coating layer 3 in place of the antireflection layer 4 or may be formed on the antireflection layer 4.

The transparent conductive film of the present invention may be formed by any method. In a case where the transparent film substrate 1 of the transparent conductive film is a single piece of transparent film substrate (as shown in FIG. 1), the hard-coating layer 3 may be formed on one side of the transparent film substrate 1, and the transparent conductive thin layer 2 may be formed on the other side of the transparent film substrate 1. In a case where the transparent film substrate 1 uses two pieces of transparent film substrate (as shown in FIG. 2), the transparent film substrates 11a and 12a may be bonded with the pressure-sensitive adhesive layer 11b interposed therebetween to form the laminate 1, and then the hard-coating layer 3 may be formed on one side of the laminate 1, while the transparent conductive thin layer 2 may be formed on the other side thereof. Alternatively, the transparent conductive thin layer 2 may be formed on one side of one transparent film substrate 12b, and the hard-coating layer 3 may be formed one side of another transparent film substrate 11a, and then the thin layer-free sides of the transparent film substrates 11a and 12a may be bonded to each other with the transparent pressure-sensitive adhesive layer 11b. In this bonding process, the pressure-sensitive adhesive layer 11b may be formed on one or both of the transparent film substrates 11a and 12a, and then these may be bonded to each other.

The transparent conductive film of the present invention preferably has a light transmittance of 86% or more, more preferably of 88% or more, still more preferably of 90% or more. If the light transmittance of the transparent film substrate is less than 86%, in some cases, the touch panel formed with the transparent conductive film of the present invention can produce a low-brightness display and can cause a problem with optical properties.

The transparent conductive film of the present invention is suitable for use as a panel plate in touch panels. Specifically, a touch panel may comprise a pair of panel plates each with a stripe-shaped transparent conductive thin layer, which are arranged opposite to each other with a spacer S interposed therebetween in such a manner that the stripe-shaped transparent conductive thin layers are orthogonal and opposite to each other. In such a touch panel, the transparent conductive film as described above may be used as one of the panel plates (generally the upper panel plate to be pressed). Such a touch panel functions as a transparent switch structure in which contact between the transparent conductive thin layers by tapping on the upper panel plate side against the elastic force of the spacer produces the ON state of an electric circuit, while removal of the press turns it to the original OFF state. The transparent conductive film of the present invention may be used for any one of the upper and lower panel plates in the touch panel, while the other panel plate to be used may be a transparent substrate of a plastic film, a glass plate or the like, which is provided with a transparent conductive thin layer. Alternatively, the transparent conductive film of the present invention may be used for both of the upper and lower plates.

EXAMPLES

The present invention is more specifically described below with some examples. Hereinafter, the term "part" or "parts" means part or parts by weight. The index of light refraction (refractive index) is a value measured with an Abbe refractometer at 25° C.

Example 1

Formation of Conductive Thin Layer

A transparent conductive thin layer made of a 25 nm-thick ITO film (2.00 in refractive index) was formed on one side of a 25 μm-thick polyethylene terephthalate film (PET Film 1) by a reactive sputtering method using a sintered material composed of 90% by weight of indium oxide and 10% by weight of tin monoxide in a $4 \times 10^3$ Torr atmosphere composed of 80% argon gas and 20% oxygen gas.

(Hard Coat Material)

A hard-coating material was prepared using the following materials: a urethane acrylate (hereinafter referred to as Component A) (100 parts of a urethane acrylate produced with pentaerythritol acrylate and hydrogenated xylene diisocyanate); polyol (meth)acrylate (hereinafter referred to as Component B) (49 parts of dipentaerythritol hexaacrylate (hereinafter referred to as Component B1 (monomer)), 41 parts of pentaerythritol tetraacrylate (hereinafter referred to as Component B4 (monomer)) and 24 parts of pentaerythritol triacrylate (hereinafter referred to as Component B5 (monomer)); and a (meth)acrylic polymer having an alkyl group containing two or more hydroxyl groups (hereinafter referred to as Component C) (59 parts of a (meth)acrylic polymer having a 2-hydroxyethyl group and a 2,3-dihydroxypropyl group, PC 1070 (trade name) manufactured by Dainippon ink and chemicals, Incorporated), and 5 parts of a polymerization initiator (Irgacure 184) and 0.5 parts of a reactive leveling agent based on the total amount of the resin components, and diluted with a mixed solvent of butyl acetate and ethyl acetate at a mixture ratio of 46:54 (the content of ethyl acetate in all the solvents: 54%) in such a manner that a solids content of 50% was obtained. The reactive leveling agent was a copolymer of dimethylsiloxane, hydroxypropylsiloxane, (6-isocyanate hexyl)isocyanuric acid, and an aliphatic polyester (6.3:1.0:2.2:1.0 in molar ratio).

(Formation of Hard-Coating Layer)

One side of a 125 μm-thick polyethylene terephthalate film (PET Film 2, Cosmoshine A4300 manufactured by Toyobo Co., Ltd.) with an adhesion facilitating treatment layer provided on both sides was coated with the above hard coating material by means of a bar coater, and the coating film was dried by heating at 100° C. for one minute. The coating film was then cured by irradiation with ultraviolet light in an integrated amount of 300 mJ/cm$^2$ from a metal halide lamp to form a 20 μm-thick hard-coating layer, so that a transparent conductive film according to this example was prepared.

(Preparation of Transparent Conductive Laminate)

An about 20 μm-thick transparent acrylic pressure-sensitive adhesive layer (produced with a mixture of one part of an isocyanate crosslinking agent and 100 parts of an acrylic copolymer of butyl acrylate, acrylic acid and vinyl acetate (100:2:5 in weight ratio)) with a controlled elastic modulus of 10 N/cm$^2$ was formed on the hard-coating layer-free side of PET Film 2. The surface of the pressure-sensitive adhesive layer was bonded to the transparent conductive thin layer-free side of PET Film 1 to form a transparent conductive laminate. The elastic modulus (dynamic storage modulus: G') is a value that was determined by temperature dispersion measurement with a viscoelastic spectrometer (ARES System manufactured by Rheometric Scientific Inc.) at a frequency of 1 Hz and 20° C.

(Preparation of Touch Panel)

The transparent conductive laminate was used as one of the panel plates. A glass plate on which a 30 nm-thick ITO thin layer was formed by the same method as described above was used as the other panel plate. Both panel plates were arranged opposite to each other with a 10 μm-thick spacer placed therebetween in such a manner that the ITO thin layers were opposite to each other, so that a touch panel for serving as a switch structure was prepared. The ITO thin layers of both panel plates were previously provided with silver electrodes orthogonal to each other, respectively, before they were arranged opposite to each other.

Example 2

In the process according to Example 1, 30 parts of PMMA particles (1.49 in refractive index) with an average particle size of 10 μm were added to the total amount of the resin components, when the hard coating material was prepared. A transparent conductive laminate and a touch panel were prepared using the process of Example 1, except that the resulting hard coating material was used instead.

Examples 3 to 8

Transparent conductive laminates and touch panels were prepared using the process of Example 2, except that the amount of the addition of fine particles, the average particle size, and the thickness of the hard-coating layer were changed as shown in Table 1.

Comparative Example 1

Formation of Hard-Coating Layer

A toluene solution was prepared by adding 5 parts of a photo-initiator of hydroxycyclohexyl phenyl ketone (Irgacure 184 manufactured by Ciba Specialty Chemicals Inc.) to 100 parts of an acrylic urethane resin (Unidic 17-806 manufactured by Dainippon Ink and Chemicals, Incorporated) and diluting the mixture with toluene to a concentration of 50% by weight. The toluene solution was applied to one side of a 125 μm-thick polyethylene terephthalate film (PET Film 2), dried at 100° C. for 3 minutes and then immediately irradiated with ultraviolet light from two ozone-type high-pressure mercury lamps (each 80 W/cm, 15 cm focused radiation) to form a 5 μm-thick hard-coating layer.

(Preparation of Transparent Conductive Laminate)

An about 20 μm-thick transparent acrylic pressure-sensitive adhesive layer (produced with a mixture of one part of an isocyanate crosslinking agent and 100 parts of an acrylic copolymer of butyl acrylate, acrylic acid and vinyl acetate (100:2:5 in weight ratio)) with a controlled elastic modulus of 10 N/cm$^2$ was formed on the hard-coating layer-free side of PET Film 2. The surface of the pressure-sensitive adhesive layer was bonded to the transparent conductive thin layer-free side of PET Film 1 obtained in Example 1 to form a transparent conductive laminate. The elastic modulus (dynamic storage modulus: G') is a value that was determined by temperature dispersion measurement with a viscoelastic spectrometer (ARES System manufactured by Rheometric Scientific Inc.) at a frequency of 1 Hz and 20° C.

(Preparation of Touch Panel)

The transparent conductive laminate was used as one of the panel plates. A glass plate on which a 30 nm-thick ITO thin layer was formed by the same method as described above was used as the other panel plate. Both panel plates were arranged opposite to each other with a 10 μm-thick spacer placed therebetween in such a manner that the ITO thin layers were opposite to each other, so that a touch panel for serving as a switch structure was prepared. The ITO thin layers of both panel plates were previously provided with silver electrodes orthogonal to each other, respectively, before they were arranged opposite to each other.

Comparative Example 2

In the process according to Comparative Example 1, 15 parts of polystyrene particles (1.59 in refractive index) with an average particle size of 3.5 μm were added to the total amount of the resin components, when the hard coating material was prepared. A transparent conductive laminate and a touch panel were prepared using the process of Comparative Example 1, except that the resulting hard coating material was used instead.

Comparative Example 3

In the process according to Comparative Example 1, 3 parts of PMMA particles (1.49 in refractive index) with an average particle size of 10 μm were added to the total amount of the resin components, when the hard coating material was prepared. A transparent conductive laminate and a touch panel were prepared using the process of Comparative Example 1, except that the resulting hard coating material was used instead.

Comparative Examples 4 and 5

Transparent conductive laminates and touch panels were prepared using the process of Comparative Example 3, except that the amount of the addition of fine particles, the average particle size, and the thickness of the hard-coating layer were changed as shown in Table 1.

Table 1 shows the thickness of the hard-coating layer and the composition of the fine particles in the transparent conductive film obtained in each of the examples and the comparative examples. Table 1 also shows the refractive index of the hard-coating layer and the refractive index of the fine particles in each case. The hard-coating layer was measured by the method described below.

(Thickness of Hard-Coating Layer)

Measurement was performed with a thickness gauge (microgauge type, manufactured by Mitutoyo Corporation). The transparent conductive film comprising the transparent film substrate and the hard-coating layer formed on the substrate was measured for thickness, and the thickness of the hard-coating layer was calculated by subtracting the thickness of the substrate from the measured thickness.

The resulting transparent conductive films (including the antiglare transparent conductive film) were also evaluated as described below. The results are shown in Table 1.

(Pencil Hardness)

The hard-coating layer-free surface of the transparent conductive film was placed on a glass plate, and then the surface of the hard-coating layer (or the antireflection layer) was subjected to a pencil hardness test according to JIS K 5400 (with a load of 500 g).

(Scratch Resistance)

The value corresponding to the degree of scratch resistance of the transparent conductive film was determined by the test procedure describe below.

(1) The sample is cut into a piece of at least 25 mm width and at least 100 mm length, and the piece is placed on a glass plate.
(2) Steel wool #0000 is uniformly attached onto a smooth cross-section of a cylinder with a diameter of 25 mm. On the surface of the sample piece, the cylinder with the steel wool is allowed to move forward and backward 30 times at a speed of about 100 mm/second under a load of 1.5 kg, and then scratch resistance is visually evaluated using the following criteria:

o: no scratch
Δ: small scratches with no influence on visibility
x: significant scratches and loss of visibility (Center-Line Average Surface Roughness Ra and Average Tilt Angle θa)

The hard-coating layer-free surface of the antiglare transparent conductive film was bonded to a glass plate (1.3 mm in thickness) manufactured by Matsunami Glass Ind., Ltd. with a pressure-sensitive adhesive. According to JIS B 0601 (1994), Ra and θa values were then determined using a high-precision micro figure measuring instrument (Surfcorder ET4000 (trade name) manufactured by Kosaka Laboratory Ltd).

(Haze)

According to JIS K 7136 (1981 version, haze (cloudiness)), measurement was performed with a haze meter (HR300 (trade name) manufactured by Murakami Color Research Laboratory).

(Slide Properties)

On the panel plate side made of the transparent conductive laminate, the tip of a polyacetal pen (0.8R in tip diameter) used was allowed to slide forward and backward 1,000,000 times under a load of 500 g at a speed of 5,000 mm/minute with a stroke of 100 mm, and then the state of the hard-coating layer surface was observed.

o: No scratch is observed at the slide portion.
Δ: Scratches are observed only at the turn-around portions of the sliding.
x: Scratches are observed over the whole of the slide portion.

TABLE 1

| | Film Thickness (μm) | Fine Particles | | | Evaluations | | | | | | | |
| --- | --- | --- | --- | --- | --- | --- | --- | --- | --- | --- | --- | --- |
| | | Added Amount (Parts) | Particle Size (μm) | Relative Particle Size (%) | Pencil Hardness | Scratch Resistance | Ra (μm) | θ (degrees) | Refractive Index of Hard-coating layer | Refractive Index of Fine Particles | Haze | Slide Properties |
| Example 1 | 20 | — | — | — | 4H | o | — | — | 1.51 | — | — | o |
| Example 2 | 20 | 30 | 10 | 50 | 4H | o | 0.107 | 0.77 | 1.51 | 1.49 | 62.5 | o |
| Example 3 | 20 | 15 | 10 | 50 | 4H | Δ | 0.098 | 0.45 | 1.51 | 1.49 | 34.5 | Δ |
| Example 4 | 20 | 30 | 15 | 75 | 4H | o | 0.220 | 0.94 | 1.51 | 1.49 | 37.6 | o |
| Example 5 | 16 | 30 | 8 | 50 | 4H | o | 0.101 | 1.02 | 1.51 | 1.49 | 47.8 | o |
| Example 6 | 16 | 30 | 10 | 63 | 4H | o | 0.123 | 1.13 | 1.51 | 1.49 | 39.9 | o |
| Example 7 | 29 | 30 | 10 | 34 | 5H | o | 0.110 | 0.88 | 1.51 | 1.49 | 61.5 | o |
| Example 8 | 23 | 30 | 15 | 65 | 5H | o | 0.165 | 1.06 | 1.51 | 1.49 | 35.2 | o |
| Comparative Example 1 | 20 | — | — | — | 2H | x | — | — | 1.53 | — | — | Δ |
| Comparative Example 2 | 5 | 15 | 3.5 | 70 | 2H | x | 0.154 | 1.67 | 1.53 | 1.59 | 43.9 | x |
| Comparative Example 3 | 20 | 3 | 10 | 50 | 2H | x | 0.060 | 0.35 | 1.53 | 1.49 | 6.0 | x |
| Comparative Example 4 | 20 | 70 | 10 | 50 | 2H | x | 0.157 | 1.88 | 1.53 | 1.49 | 60.0 | x |

TABLE 1-continued

|  | Film Thickness (μm) | Fine Particles | | | Evaluations | | | | | | | |
| --- | --- | --- | --- | --- | --- | --- | --- | --- | --- | --- | --- | --- |
|  |  | Added Amount (Parts) | Particle Size (μm) | Relative Particle Size (%) | Pencil Hardness | Scratch Resistance | Ra (μm) | θ (degrees) | Refractive Index of Hard-coating layer | Refractive Index of Fine Particles | Haze | Slide Properties |
| Comparative Example 5 | 20 | 30 | 3 | 15 | 2H | x | 0.167 | 1.00 | 1.53 | 1.49 | 50.0 | x |

It is apparent from Table 1 that the hard-coating layers have high hardness and improved scratch resistance and improved slide properties (tap properties) in the examples as compared with the comparative examples.

The invention claimed is:

1. A transparent conductive film, comprising:
   a transparent film substrate;
   a hard-coating layer provided on one side of the transparent film substrate; and
   a transparent conductive thin layer provided on another side of the transparent film substrate, wherein
   the hard-coating layer is made from a material containing a urethane acrylate, a polyol (meth)acrylate and a (meth) acrylic polymer having an alkyl group containing two or more hydroxyl groups;
   a blending amount of the polyol (meth)acrylate is from 70% by weight to 180% by weight based on the amount of the urethane acrylate; and
   an addition amount of the (meth)acrylic polymer having an alkyl group containing two or more hydroxyl groups is from 25% by weight to 110% by weight based on the amount of the urethane acrylate.

2. The transparent conductive film according to claim 1, wherein the polyol (meth)acrylate comprises pentaerythritol triacrylate and pentaerythritol tetraacrylate.

3. The transparent conductive film according to claim 1, wherein the hard-coating layer is provided on the transparent film substrate with an adhesion facilitating treatment layer interposed therebetween.

4. The transparent conductive film according to claim 1, wherein the transparent film substrate is a laminate of two or more pieces of transparent film substrate bonded to one another with a transparent adhesive layer interposed therebetween.

5. The transparent conductive film according to claim 1, wherein the hard-coating layer has an uneven outer surface.

6. The transparent conductive film according to claim 5, wherein the hard-coating layer contains fine particles and has a thickness of 15 μm to 30 μm, and
   the fine particles have an average particle size of 30% to 75% of the thickness of the hard-coating layer, and
   the fine particles form unevenness with a θa value of 0.4° to 1.5° according to JIS B 0601.

7. The transparent conductive film according to claim 1, wherein the material for forming the hard-coating layer contains a leveling agent.

8. A touch panel, comprising:
   a pair of panel plates each having a transparent conductive thin layer; and
   a spacer which is interposed between the pair of panel plates and with which the pair of panel plates are arranged opposite to each other in such a manner that the transparent conductive thin layers are opposed to each other, wherein
   at least one of the panel plates is the transparent conductive film according to claim 1.

9. The transparent conductive film according to claim 1, wherein a content of urethane acrylate is 15% by weight to 55% by weight in all the resin components of the hard-coating material.

* * * * *